United States Patent [19]

Massaro et al.

[11] Patent Number: 4,630,442

[45] Date of Patent: Dec. 23, 1986

[54] APPARATUS AND METHOD FOR PRE-FILLING A HYDRAULIC MOTOR

[75] Inventors: Peter C. Massaro, Syracuse; Ronald F. Legawiec, E. Syracuse, both of N.Y.

[73] Assignee: Trol-Mation, Inc., Syracuse, N.Y.

[21] Appl. No.: 621,563

[22] Filed: Jun. 18, 1984

[51] Int. Cl.$^4$ .................. F16D 31/02

[52] U.S. Cl. .................. 60/415; 60/441; 91/4 R; 91/519

[58] Field of Search .................. 91/519, 4 R; 60/441, 60/415

[56] References Cited

U.S. PATENT DOCUMENTS

| | | | |
|---|---|---|---|
| 1,599,199 | 9/1926 | Bayles | 91/4 |
| 2,403,912 | 3/1946 | Doll | 60/54.5 |
| 2,615,302 | 10/1952 | Camerota | 91/441 |
| 2,636,346 | 4/1953 | Hoffman | 91/441 |
| 2,641,106 | 6/1953 | Jelinek | 60/415 |
| 3,055,345 | 9/1962 | Johnson | 91/4 |
| 3,401,713 | 9/1968 | Olmsted | 91/441 |
| 3,731,592 | 5/1973 | Kreiskorte | 91/519 |
| 3,915,614 | 6/1975 | Farrell et al. | 425/450.1 |
| 4,121,449 | 10/1978 | Celi | 91/4 R |
| 4,348,943 | 9/1982 | Bouyoucos | 91/441 |

*Primary Examiner*—A. Michael Chambers
*Attorney, Agent, or Firm*—Heslin & Rothenberg

[57] ABSTRACT

A reservoir for holding pre-fill hydraulic fluid is connected at its bottom to the power input side of a hydraulic motor. A stand pipe within the reservoir is connected to a hydraulic fluid drain outlet for expulsion of excess volume hydraulic fluid. Compressed air is introduced to the reservoir at a level above the top of the stand pipe. Valving in the compressed air line is operable to three states: opened between the compressed air source and the reservoir; opened between the reservoir and the atmosphere and closed. A valve connected in the drain outlet may be opened or closed. A check valve between the reservoir and the hydraulic motor is held opened by pilot operation during return of the hydraulic fluid to the reservoir and checked closed during high pressure input to the hydraulic motor. Control means are provided for transmitting fluid under relatively low pressure to the hydraulic motor during its closure stroke and for causing said fluid to be returned to the reservoir during the retraction stroke with any excess volume hydraulic fluid being rapidly expelled through the drain outlet with a vortex being formed at the top of the stand pipe as the excess fluid enters therein.

21 Claims, 3 Drawing Figures

APPARATUS AND METHOD FOR PRE-FILLING A HYDRAULIC MOTOR

BACKGROUND AND SUMMARY OF THE INVENTION

This invention relates to hydraulic press equipment and, more specifically, it relates to a novel apparatus and method for supplying pre-fill hydraulic fluid to a hydraulic motor during its closure stroke and recovering the same during its retraction stroke.

Hydraulic press equipment generally includes a hydraulic motor consisting of a cylinder and a piston driven back and forth hydraulically. Such equipment is used for a variety of purposes such as holding the parts of an injection mold together during the injection of molding materials and for compressing materials into desired shapes and sizes. For a typical application such as press molding, the piston is operable from a "home" or fully retracted position through a closure stroke to a work position in which the mold parts are brought together, and beyond that, through a compression stroke to a fully extended or "closed" position and back again through a retraction stroke to its fully retracted position. Of course, the work for which the greatest squeezing pressure and energy is needed is done during the compression stroke. It takes relatively little energy to move the piston and its associated ram and mold parts through the closure and retraction strokes. It has therefore become a practice to use low energy and relatively low pressure hydraulic fluid for execution of the closure and retraction strokes and a high energy, relatively high-pressure hydraulic fluid for the compression stroke. In this way, very little high pressure hydraulic fluid is consumed and energy costs are therefore conserved.

Various apparatuses and method have been devised over the years to supply hydraulic fluid under low pressure to the power input side of the piston during execution of the closure stroke. Fluid supplied this way is generally called "pre-fill fluid". The system described in U.S. Pat. No. 3,915,614 to Farrell, for example, employs a reservoir from which hydraulic fluid is fed by gravity to the cylinder of a hydraulic motor as the closure stroke is being executed. When the piston is in position for execution of the compression stroke, the line to the reservoir is closed and high pressure hydraulic fluid is applied to the piston from a separate source driving it through the compression stroke. Upon execution of the retraction stroke hydraulic fluid is returned to the reservoir.

While arrangements like that described above function well enough, they are subject to certain disadvantages. First, rather large-sized and costly piping and valving is required between the reservoir and the hydraulic motor to ensure reasonably prompt transfer and return of the hydraulic fluid to and from the reservoir. Secondly, the energy required to drive the hydraulic fluid back into the reservoir is considerable. Thirdly, even with large piping, such systems tend to be fairly slow resulting in the substantial consumption of operator time. And finally, such systems do not conveniently deal with the excess volume hydraulic fluid that is transferred to the reservoir during the retraction stroke. Those skilled in the art realize that this excess volume hydraulic fluid occurs because the fluid is compressed somewhat during the compression stroke and then expands as it is transferred under relatively low pressure to the reservoir. Also, if the piston is further advanced during the compression stroke, more fluid is added to the cylinder which will be transferred to the reservoir. Although it is possible to pipe fluid from the reservoir back to the hydraulic power unit from which the high pressure hydraulic fluid is supplied, this arrangement is subject to the same shortcomings mentioned above.

It is therefore an object of this invention to provide an apparatus and a method for supplying prefill hydraulic fluid from a reservoir to a hydraulic motor and for returning that hydraulic fluid to the reservoir while expeditously expelling excess volume hydraulic fluid to the tank of a hydraulic power unit.

It is a further object of this invention to provide an apparatus and method of the character described in which relatively small and inexpensive piping and valving of conventional types may be used.

It is a further object of this invention to provide an apparatus and method of the type described in which the transfer of pre-fill hydraulic fluid to and from a reservoir is made in very little time, thus allowing a hydraulic press to execute cycles rapidly.

Finally, it is an object of this invention to provide a method and an apparatus of the type described in which very little energy is consumed in the transfer of pre-fill hydraulic fluid to and from the reservoir.

Briefly described, the apparatus of this invention employs a reservoir for holding a supply of hydraulic fluid for use in pre-filling a hydraulic motor during its closure stroke and recovering that hydraulic fluid when it is displaced by the motor during its retraction stroke. The reservoir is provided with a pre-fill fluid port connected to the motor and a hydraulic fluid drain outlet for discharging excess volume hydraulic fluid. Means are provided for controllably pressurizing the internal space of the reservoir. Control means connected in the hydraulic fluid drain outlet and the pre-fill fluid port and to the motor and the pressurizing means causes the hydraulic fluid to be transmitted to the motor under pressure as the piston executes its closure stroke and to be returned to the reservoir as it is displaced by the motor during its retraction stroke with any excess volume hydraulic fluid being expelled under pressure through the hydraulic fluid drain outlet.

Also briefly described, the method of this invention as applied to a hydraulic press comprises the steps of advancing the piston through its closure stroke, supplying a predetermined volume of pre-fill hydraulic fluid under relatively low pressure to the motor as the closure stroke is executed, driving the piston with relatively high pressure hydraulic fluid through its compression stroke, retracting the piston through its retraction stroke, collecting hydraulic fluid displaced from the motor as the piston executes its retraction stroke, reserving from the collected hydraulic fluid substantially the same volume as that which was supplied to the motor during the closure stroke and expelling under pressure any excess volume hydraulic fluid created during execution of the method.

DETAILED DESCRIPTION OF THE DRAWINGS

Figure 1:
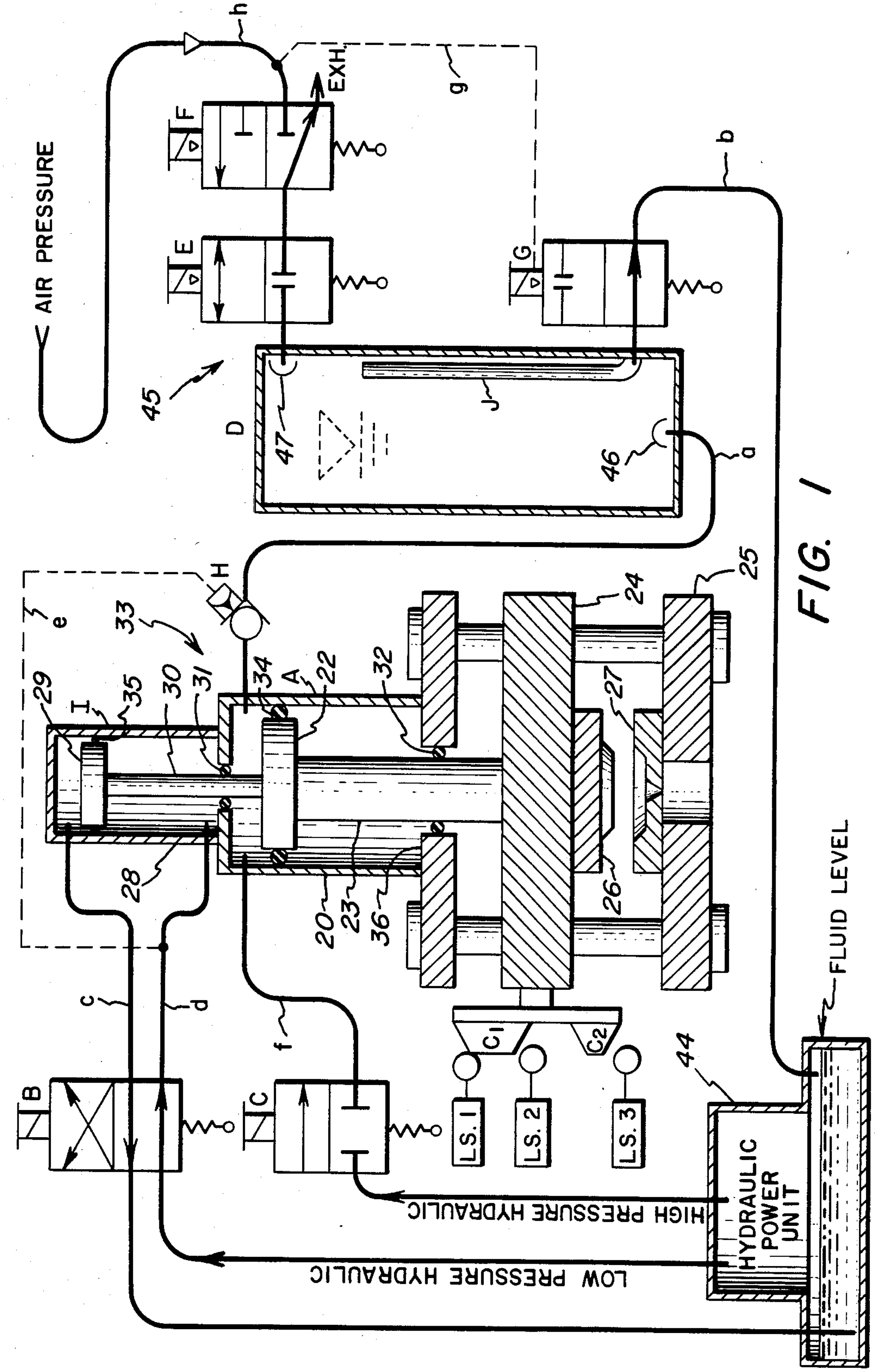
FIG. 1 is a schematic view showing a hydraulic press in section incorporating the invention and showing the hydraulic lines and control devices required.

FIG. 1 shows a hydraulic press 33 having a hydraulic motor A comprised of a cylinder 20 and a piston 22. Piston 22 is connected to a ram 23 which, in turn, is connected to a movable platen 24. Platen 24 may have the movable part 26 of a mold mounted for closure with stationary part 27. Stationary part 27 is typically mounted on a stationary platen 25. During operation of press 33, piston 22 moves from a fully retracted position downwardly through a closure stroke to a work position, and beyond that, through a compression stroke to a fully closed position. During these movements mold parts 26 and 27 are first brought relatively close together by execution of the closure stroke and then driven through the compression stroke. It is generally during the compression stroke that some work is done. In a typical application friction brake materials are squeezed during a compression stroke while at the same time being subjected to heat. Obviously, presses of this sort can be used for many other purposes and applications as well.

In executing the closure stroke of piston 22 it is desirable to use a relatively low energy form of power. This can be accomplished, for example, by using low pressure hydraulic fluid in a jack cylinder, but it can be accomplished in any other suitable manner. FIG. 1 shows a jack cylinder I mounted atop hydraulic motor A with its cylinder 28 and piston 29 centrally aligned with the axis of motor A. Piston 29 is connected to piston 22 by means of a connecting rod 30. Thus, whenever piston 29 is driven upwardly or downwardly, piston 22 will move in unison with it. Seals 34 and 35 are provided between pistons 22 and 29, respectively, and their associated cylinders 20 and 28. Seals 31 and 32 are provided between connecting rod 30 and the top of cylinder 20 and between ram 23 and its front wall 36. Low pressure hydraulic fluid is supplied to jack cylinder I and returned to hydraulic power unit 44 through lines c and d. A solenoid valve B is connected in lines c and d for switching lines c and d between a closure and a retracting mode. As shown in FIG. 1, solenoid valve B is deenergized and biased by its spring into a retraction mode. When solenoid B is energized the low pressure hydraulic fluid is driven through line c to the power input side of piston 29 and returned from the power output side through line d to the hydraulic power unit 44, thus placing the jack cylinder I in a closure mode. High pressure hydraulic fluid is supplied by hydraulic power unit 44 to the power input side of piston 22 in the hydraulic motor A through line f. Solenoid valve C controls the status of line f as being opened or closed and is spring biased to its closed position.

Reservoir D is provided in a location conveniently close to hydraulic motor A. The general purpose of reservoir D is to supply pre-fill hydraulic fluid through hydraulic line a to the upper or power side of piston 22 as it is closed through the action of jack cylinder I. Also, when piston 22 is retracted through the action of jack cylinder I the hydraulic fluid thereby displaced is returned to reservoir D through hydraulic line a. A check valve H is used in line a to prevent the backflow of hydraulic fluid into reservoir D when high pressure hydraulic fluid is applied through line f to the power side of piston 22. When piston 22 is being retracted, however, check valve H is held open through operation of its pilot through hydraulic pilot line e.

A stand pipe J is connected to a hydraulic fluid drain outlet for reservoir D. Air/solenoid valve G is connected in drain outlet hydraulic line b in order to control its operation. Air/solenoid valve G is operable between two positions, opened and closed, and is spring biased to its open position as shown. Valves of this type can be energized only when an appropriate air pressure and an electrical signal are present. The necessary air pressure is input to valve G by means of pneumatic pilot line g. One means for providing an electrical input will be described with reference to FIG. 2.

Reservoir D is also connected at a point above its stand pipe to a compressed air source (not shown) through pneumatic line h. Air/solenoid valves E and F are connected in line h for the purpose of controlling the input and exhausting of compressed air to and from reservoir D. Valve E has two positions, opened and closed, and is spring biased to its closed position as shown. Valve F has two positions, one in which it permits compressed air to be exhausted into the atmosphere and the other in which it permits air under pressure to pass to or from the compressed air supply through line h. It may be seen that valves E and F provide three control states in line h. First, when both valves are energized, air pressure is allowed to pass from the compressed air supply into reservoir D or from reservoir D to the compressed air source when the pressure in reservoir D is greater. Secondly, when valve E is energized and valve F is deenergized, compressed air from reservoir D is allowed to be exhausted into the atmosphere. Thirdly, when valve E is deenergized it is closed, thereby simply blocking line h. Valves E and F can be actuated only by the presence of a suitable air pressure and an electrical signal for energizing their solenoids.

Drain outlet line b eliminates excess volume hydraulic fluid by returning it under pressure to the tank of the hydraulic power unit 44.

Figure 2:
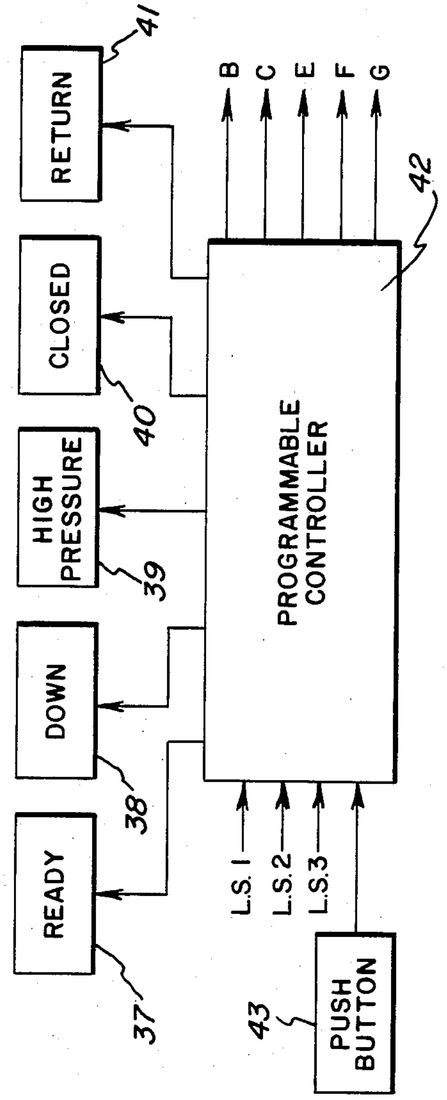
FIG. 2 is a schematic diagram showing how the control devices in FIG. 1 are electrically connected with one another and controlled.

FIG. 2 shows one way in which automatic control can be provided for the subject invention. A programmable controller 42 is used to monitor and direct the sequence of operations of the press 33 and the prefill hydraulic fluid system 45. Programmable controller 42 may be any suitable device such as a "POWR-TRAK, SYSTEM III" manufactured by Adatek, Inc. of Sand Point, Idaho, as described in its data sheet entitled "POWRTRAK, SYSTEM III" bearing copyright date 1984. This controller is readily programmed using well-known techniques in Process State Monitor (PSM) language. The particular programming for the illustrated application will be discussed below.

As shown in FIG. 2 and in Appendix A attached hereto and made a part hereof, programmable controller 42 is provided with four input signals Three of these are derived from limit switches LS1, LS1 and LS3 (See FIG. 1) as those switches are closed by cams C1 and C2 during the operation of press 33. The fourth input is provided by means of push button 43. The outputs of programmable controller 42 include five signals for the energization of relays B, C, E, F and G, as shown in FIG. 2. Five additional outputs are used to light lamps 37–41 indicating respectively that the press is READY for operation, that it is in a DOWN mode in which piston 22 is executing a closure or a compression stroke, that HIGH PRESSURE hydraulic fluid is being applied to the power input side of piston 22, that the piston (and consequently the mold) has reached its fully CLOSED position and that the press is in a state of RETURN during which piston 22 is executing a retraction stroke.

Figure 3:
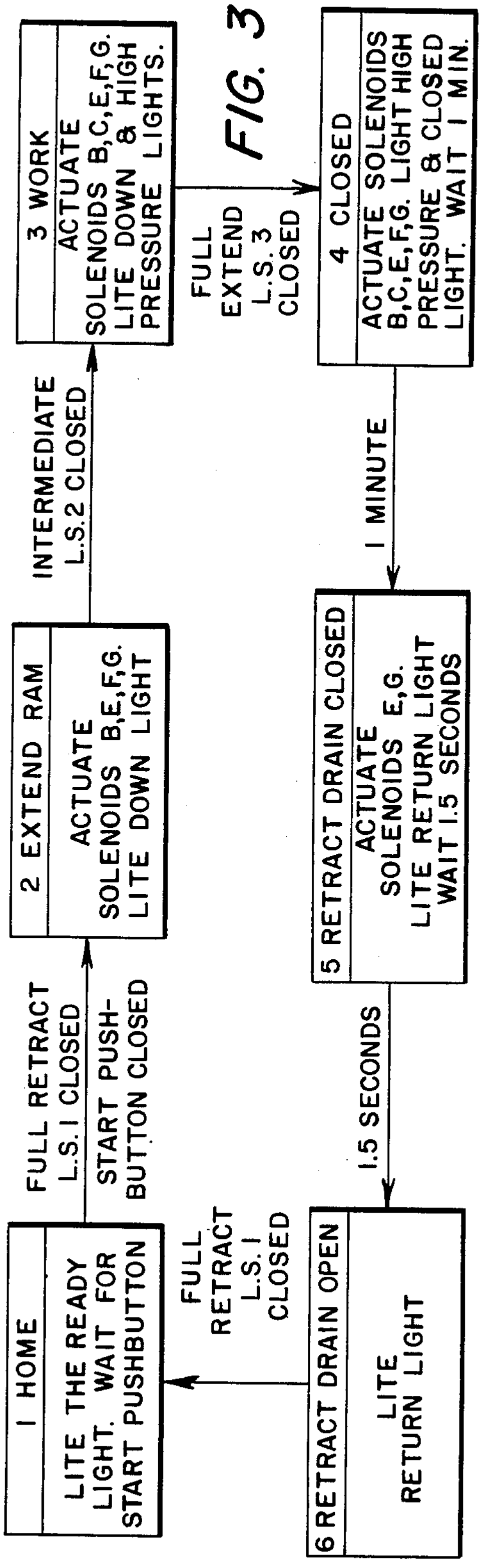
FIG. 3 is a state diagram illustrating how the controller of FIG. 2 may be programmed for a specific application.

The programming of controller 42 for a typical application is illustrated by the State diagram shown in FIG. 3. In phase 1, the "home" position, the press is fully retracted and ready to be operated Controller 42 issues a signal for lighting lamp 37 READY and the system is waiting for an input from push button 43 to initiate a cycle. The flow passes to phase 2, "extend ram", upon depression of push button 43 at a time when swith LS1 is closed indicating full retraction. In phase 2, controller 42 issues signals for energizing Solenoids B, E, F and G. By referring to FIG. 1, it may be seen that this combination of solenoid states will cause low pressure hydraulic fluid to pass through line c to the power input side of piston 29 and hydraulic fluid to be returned from the power output side of piston 29 through line d to the hydraulic power unit. Accordingly, pistons 29 and 22 will advance through a closure stroke moving mold parts 26 and 27 close together. Since solenoids E and F are energized, compressed air will be applied to the hydraulic fluid in reservoir D. Before initiating a cycle, a sufficient amount of hydraulic fluid for the intended application is placed in reservoir D. Thus, hydraulic fluid will be forced under pressure through hydraulic line a and valve H into the power input side of piston 22 as the closure stroke is executed. The fluid so transmitted to cylinder 20 is called "pre-fill" hydraulic fluid. With the solenoid of valve G energized, no hydraulic fluid will be allowed to escape through stand pipe J.

When press 33 reaches its "work" position, switch LS2 will be closed and program flow will proceed to phase 3. At that point, the microcontroller will issue signals for the continued energization of the solenoids of valves B, E, F and G and a new signal for the energization of the solenoid of valve C. Also, it will continue to issue a signal for lighting the DOWN lamp 38 and a new signal for lighting HIGH PRESSURE lamp 39. Phase 4 "closed" is reached when piston 42 if fully extended and mold parts 26 and 27 have completely closed. At this point, switch LS3 is closed causing program flow to enter phase 4. In phase 4, the solenoids of the same valves B, C, E, F and G remain energized and a pause of one minute is executed. It will, of course, be understood that a different time delay or none at all could be employed. After one minute has elapsed, program flow proceeds to phase 5 "retract, drain closed". During phase 5, only the solenoids of valves E and G are energized. With valve E energized and F deenergized, reservoir D is vented to the atmosphere. Also, valve G is closed, thus preventing the escape of any hydraulic fluid or air through stand pipe J. With valve B in its deenergized state, low pressure hydraulic fluid is provided to the power output side of piston 29 through hydraulic line d and hydraulic fluid from the power input side of piston 29 is returned through hydraulic line c to hydraulic power unit 44. Valve C is closed. Under these circumstances, press 33 will execute a retraction stroke returning pistons 29 and 22 and mold part 26 to their fully retracted positions. As piston 22 is so retracted, hydraulic fluid will be displaced from cylinder 20 through valve H and hydraulic line a into the bottom of reservoir D. It should be noted that valve H will be held open by energization of its pilot through hydraulic pilot line e which is connected to low pressure hydraulic line d. It will be understood that reservoir D will gradually fill with hydraulic fluid from the bottom as displaced air is exhausted through pneumatic line h and valves E and F. This condition is maintained until the hydraulic fluid reaches the top of stand pipe J where it is open. In this example, it is assumed that the time required for this to occur is 1.5 seconds. At that point, program control will flow to phase 6 "retract, drain opened". It should be noted that triggering events other than a 1.5 second delay could be used to determine when program flow should proceed to phase 6. For example, a sensor could be used in reservoir D for detecting the level of hydraulic fluid therein and providing a suitable input to controller 42 to initiate phase 6.

In phase 6 the solenoids of valves B, C, E, F and G are deenergized. The retraction stroke of press 33 will continue. Valve E will be closed thus blocking pneumatic line h and valve G will be opened, thus permitting hydraulic fluid to be expelled through stand pipe J and hydraulic line b as hydraulic fluid displaced from cylinder 20 is forced through line a into reservoir D. With reservoir D oriented so that stand pipe J is in a vertical position, a vortex will be formed at the top of stand pipe J. Also, a cushion of air pressure will be maintained above the hydraulic fluid within reservoir D. As a consequence, the hydraulic fluid will be expelled very rapidly through stand pipe J and line b. This rapid expulsion of hydraulic fluid is highly advantageous in that it permits the use of relatively small piping and fixtures. If one were to depend simply upon gravity return of the hydraulic fluid to hydraulic power unit 44, much larger pipes would be required. It should also be noted that air/solenoid valves E, F, G and H and solenoid valves B and C are standard components readily available in the marketplace. Furthermore, the energy consumption used to drive the returning hydraulic fluid is minimal.

The volume of fluid forced by displacement into reservoir D upon the retraction of piston 22 exceeds the volume of fluid used to prefill cylinder 20. This occurs to some extent in all cases because the use of high pressure hydraulic fluid during the power stroke compresses the hydraulic fluid within cylinder 20 slightly thereby permitting more hydraulic fluid to enter. Upon release of high pressure and displacement of the fluid under relatively low pressure to reservoir D, the volume of the fluid will expand somewhat. Also, in applications where movement of piston 22 is significant, an even greater amount of high pressure hydraulic fluid will be admitted to cylinder 20. This will give rise to an even larger amount of excess volume hydraulic fluid being transferred to reservoir D.

To assist in avoiding turbulence or entrainment of air bubbles in the hydraulic fluid in reservoir D, the hydraulic fluid line a is provided with a baffle 46 internal to reservoir D where line a enters reservoir D and compressed air line h is similarly provided with a baffle 47 internal to reservoir D where it enters reservoir D.

Once press 33 reaches its fully retracted position, limit switch LS1 will be depressed by cam C1. This will cause program control to flow back to phase 1 after which another cycle may be initiated.

The programming for the sequence of operations described above, as applied to the Adatek programmable controller 42, also described above, is set forth in Appendix A. The terminology used in said program is believed to be conventional and in any event is described in Adatek's data sheet entitled "Power Track, PSM 1.x & 2.x, (process state monitor)" bearing copyright date 1983.

What has been described is a hydraulic motor pre-fill system which operates rapidly while consuming a minimal amount of energy and which employs low cost standard parts of small dimension. One of its important characteristics is that there is virtually no entrainment of air in the hydraulic fluid. Thus, the system can operate indefinitely without any problems arising due to aeration of the fluid.

What has been described is the preferred embodiment of the invention. There are many modifications which can be made to the system without changing its essence and it is intented that all such modifications be within the compass of the appended claims. For example, limit switches LS1, LS2 and LS3 could be replaced by other means for sensing and monitoring the movement and position of the elements of the hydraulic press. Other structures and different valving arrangements could be used for controlling the pressure within reservoir D. Undoubtedly, those skilled in the art will perceive other changes which do not depart from the essential spirit of the invention.

APPENDIX A

| | I/O # | PROGRAM: LINE: |
|---|---|---|
| INPUTS | | |
| Full Retract Limit Switch LS1 | 1 | |
| Intermediate Limit Switch LS2 | 2 | |
| Full Extend Limit Switch LS3 | 3 | |
| Start Push Button | 4 | |
| OUTPUTS | | |
| Ready Light | 5 | 100 LINK #9800 |
| Down Light | 6 | 101:T1A5:T1T4G2 |
| High Pressure Light | 7 | 102:A10A12A13A14A6:T2G3 |
| Closed Light | 8 | 103:A10A11A12A13A14A6A7:T3G4 |
| Return Light | 9 | 104:A10A11A12A13A14A7A8:E600G5 |
| Solenoid B | 10 | 105:A12A14A9:E15G6 |
| Solenoid C | 11 | 106:A9:T1G1 |
| Solenoid E | 12 | 900: |
| Solenoid F | 13 | |
| Solenoid G | 14 | |

What is claimed is:

1. In a hydraulic press of the type having a hydraulic power unit with a hydraulic fluid tank and an independent means for advancing and retracting the piston of a hydraulic motor, a hydraulic fluid pre-fill system comprised of:

a reservoir for holding a supply of hydraulic fluid for use in pre-filling the hydraulic motor, said reservoir having a gas inlet for connection to a compressed gas source, a pre-fill fluid port connected to the power input side of the hydraulic motor and a hydraulic fluid drain outlet for discharging excess volume hydraulic fluid; and control means connected in the gas inlet, the hydraulic fluid drain outlet and the pre-fill fluid port for causing hydraulic fluid to be transmitted from the reservoir to the hydraulic motor under pressure from the compressed gas source as the piston is advanced, and for allowing hydraulic fluid to be discharged from the motor to the reservoir as the piston is retracted with any excess fluid being discharged from the reservoir under compressed gas pressure through the hydraulic fluid drain outlet.

2. The invention of claim 1 wherein the hydraulic fluid drain outlet includes a standpipe with an opening at a predetermined level within the reservoir and wherein the gas inlet communicates with the interior space of the reservoir above that level and the pre-fill fluid port communicates with the same space below that level.

3. The invention of claim 2 wherein the control means comprises valving in the gas inlet, the pre-fill fluid, port, and the hydraulic fluid drain outlet.

4. The invention of claim 3 wherein the gas inlet valving is operable between a pressurization state in which gas under pressure is admitted to the reservoir, an exhaust state in which gas under pressure in the reservoir is allowed to escape into the atmosphere and a closed state in which gas is not permitted to escape from the reservoir and wherein the valving in the drain outlet is independently operable between an opened and a closed state.

5. The invention of claim 4 wherein the control means further comprises sequencing means for operating the gas inlet valving to its exhaust state as the piston begins to retract while maintaining the drain outlet valving closed and then, after a preselected time interval, operating the gas inlet valving to its closed state and the drain outlet valving to its open state.

6. The invention of claim 5 wherein the pre-fill fluid port valving is effective to prevent the backflow of fluid toward the reservoir whenever the fluid pressure in the hydraulic motor exceeds the pressure in the reservoir by a predetermined amount.

7. The invention of claim 6 wherein the hydraulic press includes a hydraulic power unit with a hydraulic fluid tank and the drain outlet is connected to that tank.

8. The invention of claim 7 wherein the compressed gas inlet and the hydraulic fluid port are provided with baffles internal to the reservoir for reducing turbulence as gas and fluid, respectively, flow into the reservoir.

9. Hydraulic press apparatus comprised of: a hydraulic motor having a piston operable from a retracted position through a closure stroke to a work position and beyond that through a compression stroke to a fully closed position and back again to the retracted positon;

means for operating the piston from its retracted position through its closure stroke to its work position and from its fully closed position to its retracted position;

means including a hydraulic power unit with a hydraulic fluid tank for supplying hydraulic fluid at sufficient presssure to drive the piston through its compression stroke;

a reservoir for holding a supply of hydraulic fluid for use in pre-filling the hydraulic motor, said reservoir having a gas inlet for connection to a compressed gas source, a pre-fill fluid port connected to the power input side of the hydraulic motor and a hydraulic fluid drain outlet for discharging excess pre-fill fluid; and control means connected in the gas inlet, the hydraulic fluid drain outlet and the pre-fill port and to the motor for causing hydraulic fluid to be transmitted from the reservoir to the hydraulic motor under pressur from the compressed gas source as the piston is operated through its closure stroke and for allowing hydraulic fluid to be discharged from the motor to the reservoir as the piston is retracted with any excess fluid being discharged from the reservoir under compressed gas pressure through the hydraulic fluid drain outlet.

10. The invention of claim 9 wherein the the hydraulic fluid drain outlet includes a standpipe with an opening at a predetermined level within the reservoir and wherein the gas inlet communicates with the interior space of the reservoir above that level and the pre-fill fluid port communicates with the same space below that level.

11. The invention of claim 10 wherein the control means comprises valving is the gas inlet, the pre-fill port, and the hydraulic fluid drain outlet.

12. The invention of claim 11 wherein the gas inlet valving is operable between a pressurization state in which gas under pressure is admitted to the reservoir, an exhaust stae in which gas under pressure in the reservoir is allowed to escape into the atmosphere and a closd state in which gas is not permitted to escape from the reservoir and wherein the valving in the drain outlet is independently operable between an opened and a closed state.

13. The invention of claim 12 wherein the control means further comprises sequencing means for operating the gas inlet valving to its exhaust state as the piston begins to retract while maintaining the drain outlet valving closed and then, after a preselected time interval, operating the gas inlet valving to its closed state and the drain outlet valving to its open state.

14. The invention of claim 13 wherein the pre-fill fluid port valving is effective to prevent the backflow of fluid toward the reservoir whenever the fluid pressure in the hydraulic motor exceeds the pressure in the reservoir by a predetermined amount.

15. The invention of claim 14 wherein the supplying means is a hydraulic power unit and the drain outlet is connected to that unit.

16. The invention of claim 15 wherein the compressed gas inlet and the hydraulic fluid port are provided with baffles internal to the reservoir for reducing turbulence as gas and fluid, respectively, flow into the reservoir.

17. A method for operating a hydraulic motor of the type having a piston which is advanceable from a retracted position through a closure stroke to a work position and beyond that through a compression stroke to a fully closed position and back through a retraction stroke to its retracted position comprising the steps of:

advancing the piston through its closure stroke;

supplying from a reservoir a predetermined volume of pre-fill hydraulic fluid under reatively low pressure from a compressed gas source to the power input side of the motor as the closure stroke is executed;

driving the piston with relatively high pressure hydraulic fluid through its compression stroke;

retracting the piston through its retracting stroke;

discharging into the reservoir hydraulic fluid displaced from the motor as the piston executes its retraction stroke;

reserving from the displaced hydraulic fluid substantially the same volume as that which was supplied to the motor during the closure stroke; and expelling from the reservoir under pressure created by compressed gas any excess volume hydraulic fluid.

18. The method of claim 17 wherein the supplying, discharging, reserving and expelling steps are accomplished with the use of a closed reservoir connected to the hydraulic motor and having an outlet for expelling excess volume hydraulic fluid.

19. The method of claim 18 wherein the internal pressure of the reservoir is controlled to permit the steps of discharging and expelling to occur at predetermined rates.

20. The method of claim 17 or 19 in which the reservoir is de-pressurized during at least part of the time the discharging step is executed.

21. In combination with a hydraulic motor of the type haivng a hydraulic power unit with a hydraulic fluid tank and a piston advanceable from a retracted position through a closure stroke to a work position and beyond that through a compression stroke to a fully closed position and back through a retraction stroke to its retracted position comprising:

a reservoir for holding a supply of hydraulic fluid for use in pre-filling the motor during its closure stroke and collecting hydraulic fluid displaced by the motor during its retraction stroke, said reservoir having a pfe-fill fluid port connected to the power input side of the motor and a hydraulic fluid drain output for discharging excess volume hydraulic fluid;

means for controllably pressurizing and de-pressurizing the internal space of the reservoir; and control means connected in the hydraulic fluid drain outlet and the pre-fill fluid port and connected to the motor and the pressurizing and de-pressurizing means for causing hydraulic fluid to be transmitted to the motor under pressure as the piston executes its closure stroke and for causing hydraulic fluid displaced by the motor during its retraction stroke to be transmitted to the reservoir with any excess volume hydraulic fluid being expelled under pressure through the hydraulic fluid drain outlet.

* * * * *